(12) United States Patent
Färm, deceased et al.

(10) Patent No.: US 6,244,602 B1
(45) Date of Patent: Jun. 12, 2001

(54) METHOD FOR SEALING EXTRACTION APPARATUS

(75) Inventors: Kari Färm, deceased, late of Espoo, by Anu Färm, legal representative; by Outi Kaarina Färm, legal representative, Helsinki; by Seppo Blomqvist, Tornio, all of (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/318,025

(22) Filed: May 25, 1999

(30) Foreign Application Priority Data

May 26, 1998 (FI) .......................................................... 981161

(51) Int. Cl.⁷ .............................. F16J 15/48; B01D 17/00
(52) U.S. Cl. ............................ 277/646; 210/511; 210/513
(58) Field of Search ................................... 277/605, 644, 277/645, 646, 647, 913, 921; 210/511, 538, 540, 513

(56) References Cited

U.S. PATENT DOCUMENTS

| 3,640,218 | * | 2/1972 | Allison . |
|---|---|---|---|
| 3,889,707 | * | 6/1975 | Fay et al. . |
| 4,346,005 | * | 8/1982 | Zimmerman . |
| 4,593,727 | * | 6/1986 | Ulveling . |
| 4,632,744 | * | 12/1986 | Murakami et al. . |
| 4,682,443 | * | 7/1987 | Demo . |
| 4,747,601 | * | 5/1988 | Glachet . |
| 4,892,116 | * | 1/1990 | Grasseschi . |
| 4,915,796 | * | 4/1990 | Denofrio . |
| 4,920,582 | * | 5/1990 | Alker . |
| 5,503,747 | * | 4/1996 | Vion et al. . |
| 5,558,780 | * | 9/1996 | Vancas . |
| 5,965,857 | * | 10/1999 | Hughes . |

FOREIGN PATENT DOCUMENTS 0 167 653  *  7/1984  (EP) .

* cited by examiner

Primary Examiner—Anthony Knight
Assistant Examiner—Vishal Patel
(74) Attorney, Agent, or Firm—Morgan & Finnegan, LLP

(57) ABSTRACT

This invention relates to a Seal Element particularly for sealing the junction between the settler of an extraction apparatus and the overflow launder located at the far end of the settler. The essential factor is that the junction between the overflow launder and actual settler, which is a non-circular profile joint, is sealed with an elastic seal.

9 Claims, 5 Drawing Sheets

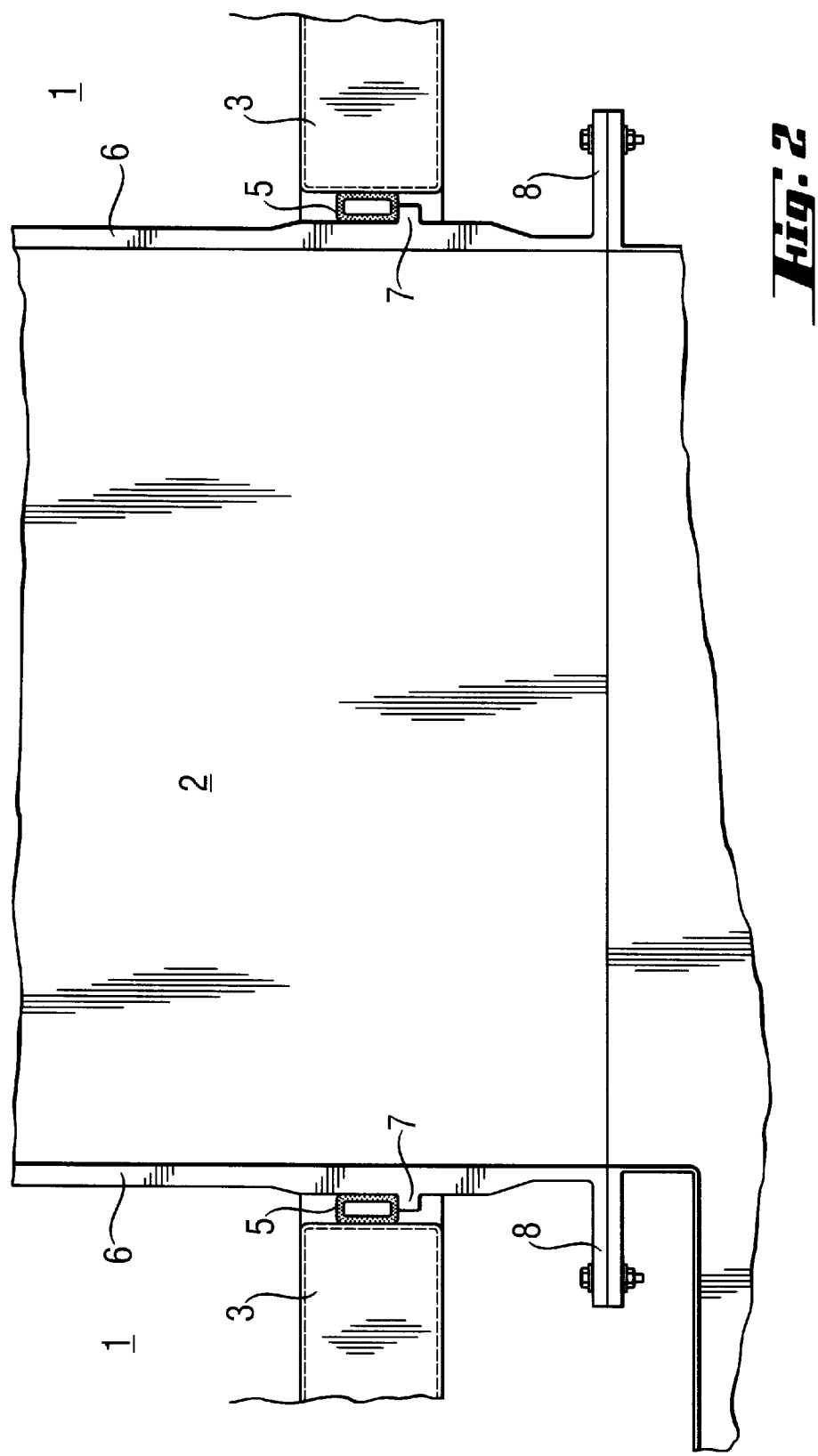

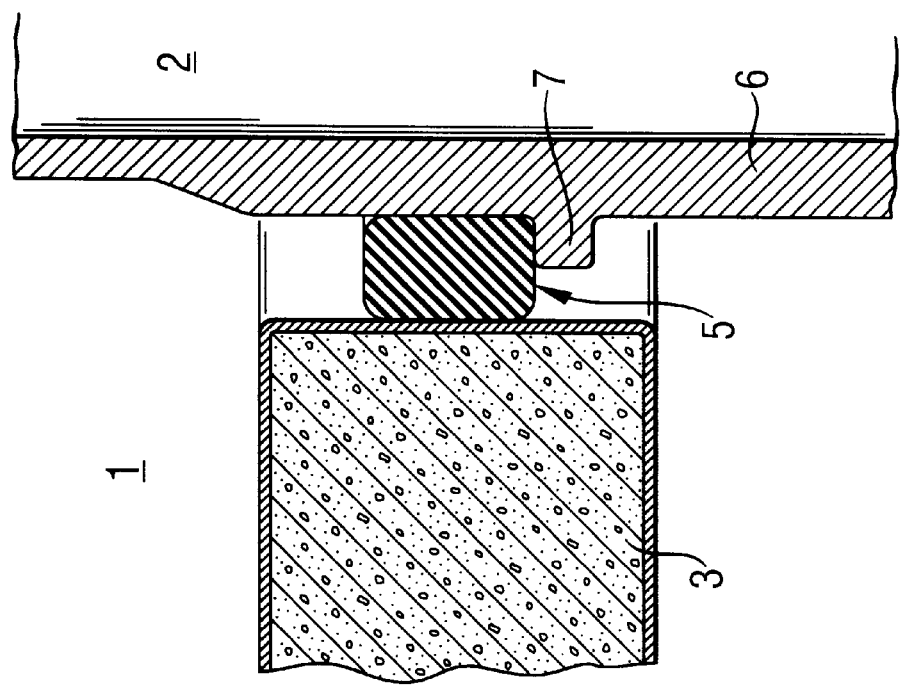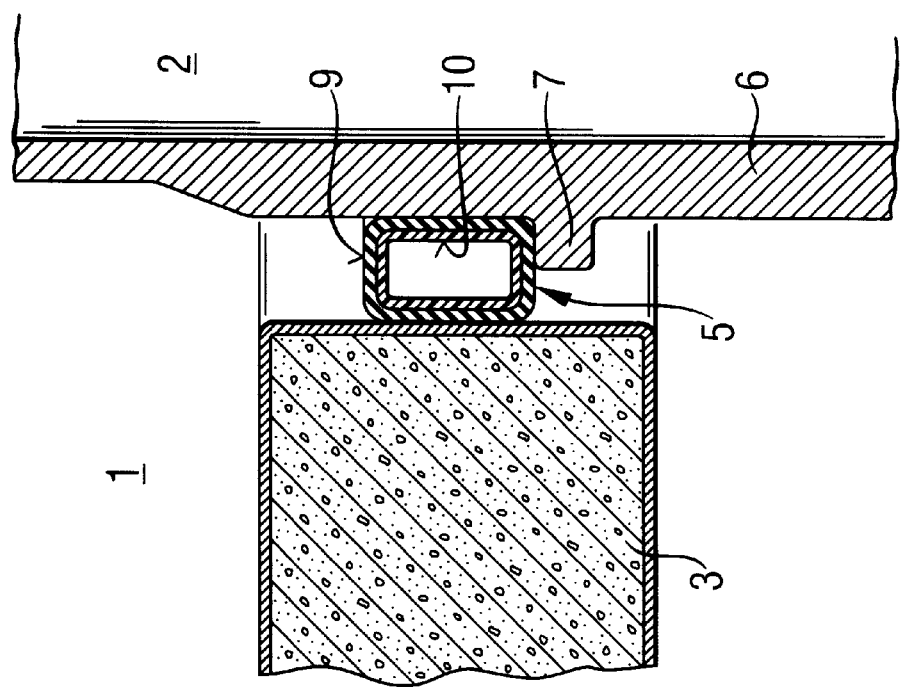

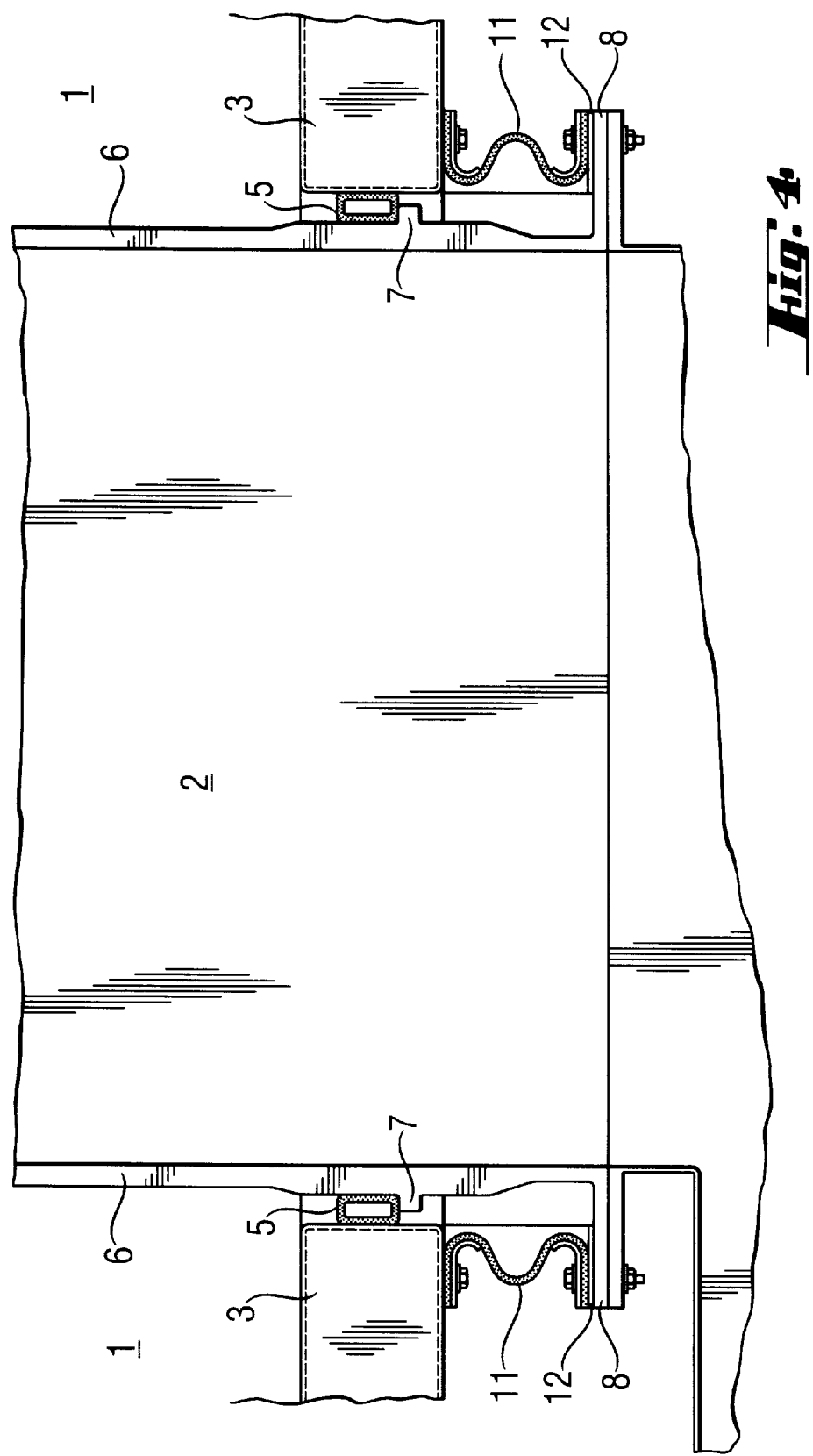

METHOD FOR SEALING EXTRACTION APPARATUS

This invention relates to a method especially for sealing the junction between the settler of an extraction apparatus and the overflow launder located at the far end of the settler. It is essential that the junction between the overflow launder and the settler, which is a non-circular profile joint, is sealed with an elastic seal.

Earlier settler constructions pertained to an extraction equipment have been mainly made of acid-resistant steel, in which case joining of the parts has managed reasonably. Now that the settler in particular is made of concrete and the launder can be made of acid-resistant steel or a glass fibre-type material, connecting the parts of the settler has become important, since changes due to heat expansion alone can cause leaks in otherwise tight junctions. Furthermore, ease of installation and replacement are important factors.

According to this invention, an overflow launder, located transversely seen from the flow direction in the settler and connected to the side walls of the settler at its far end, is sealed against liquid leaks at its joining points by one or more elastic sealing elements. The primary seal at the junction of the overflow launder and settler wall is formed by tightly pressable, elastic, hose-type sealing element, whose efficiency can be increased with other seal and support structures. The seal is preferably a hose-type sealing element, pressurizable by air, but it can also be a solid rubber profile. When in place, the seal is basically U-shaped. Then, according to this method, also a non-circular profile junction can be sealed with an elastic seal.

In addition to the pneumatic hose-type seal located between the structures, the seal can be further improved by placing a second elastic-type element around the junction. The additional seal is essentially flat and is fitted so that one edge is attached to the settler and the other to the launder construction.

The essential novel features of this invention become apparent in the attached patent claims.

The invention is described in more detail in the attached figuress, in which

Figure 1:
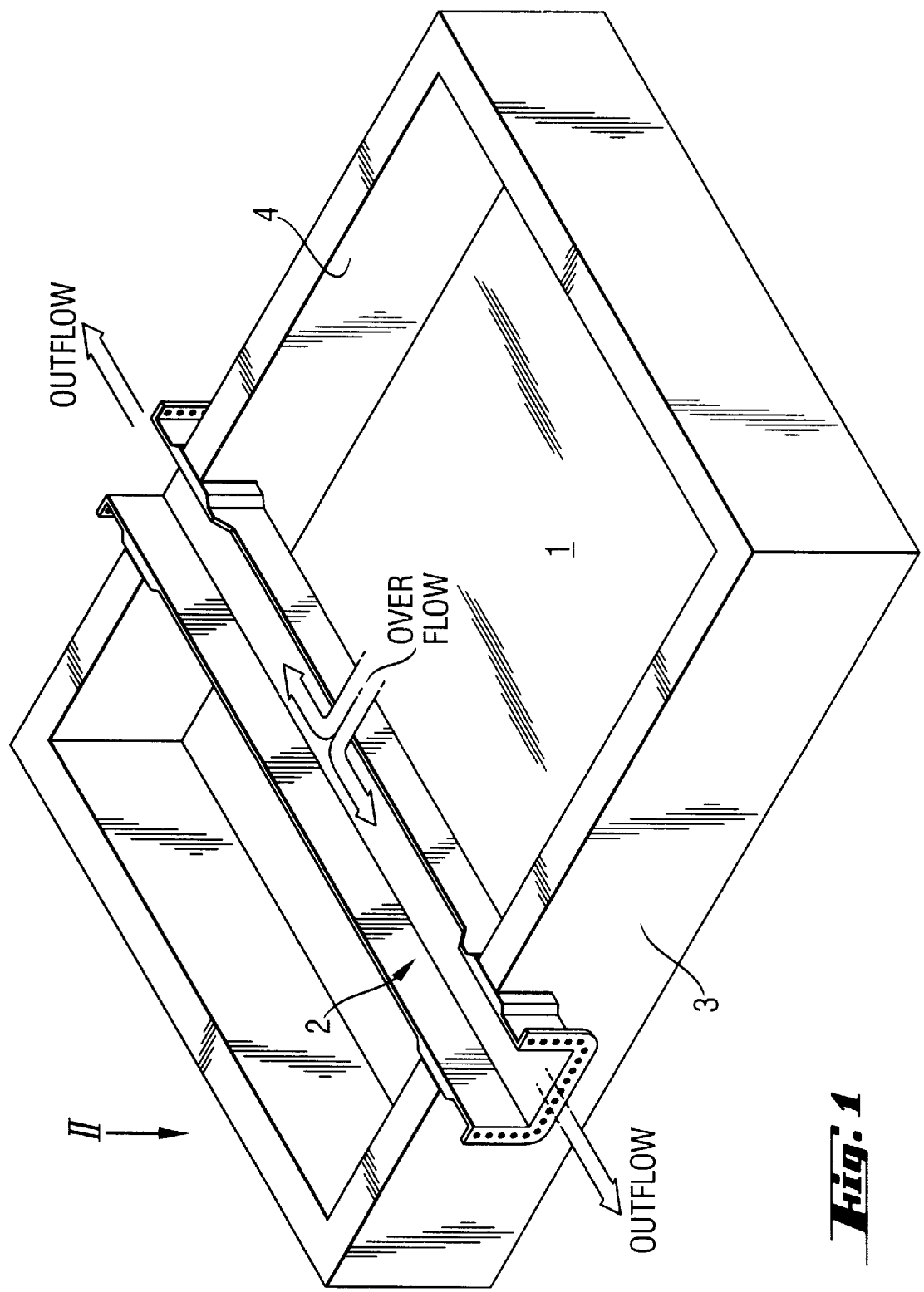
Figure 5:
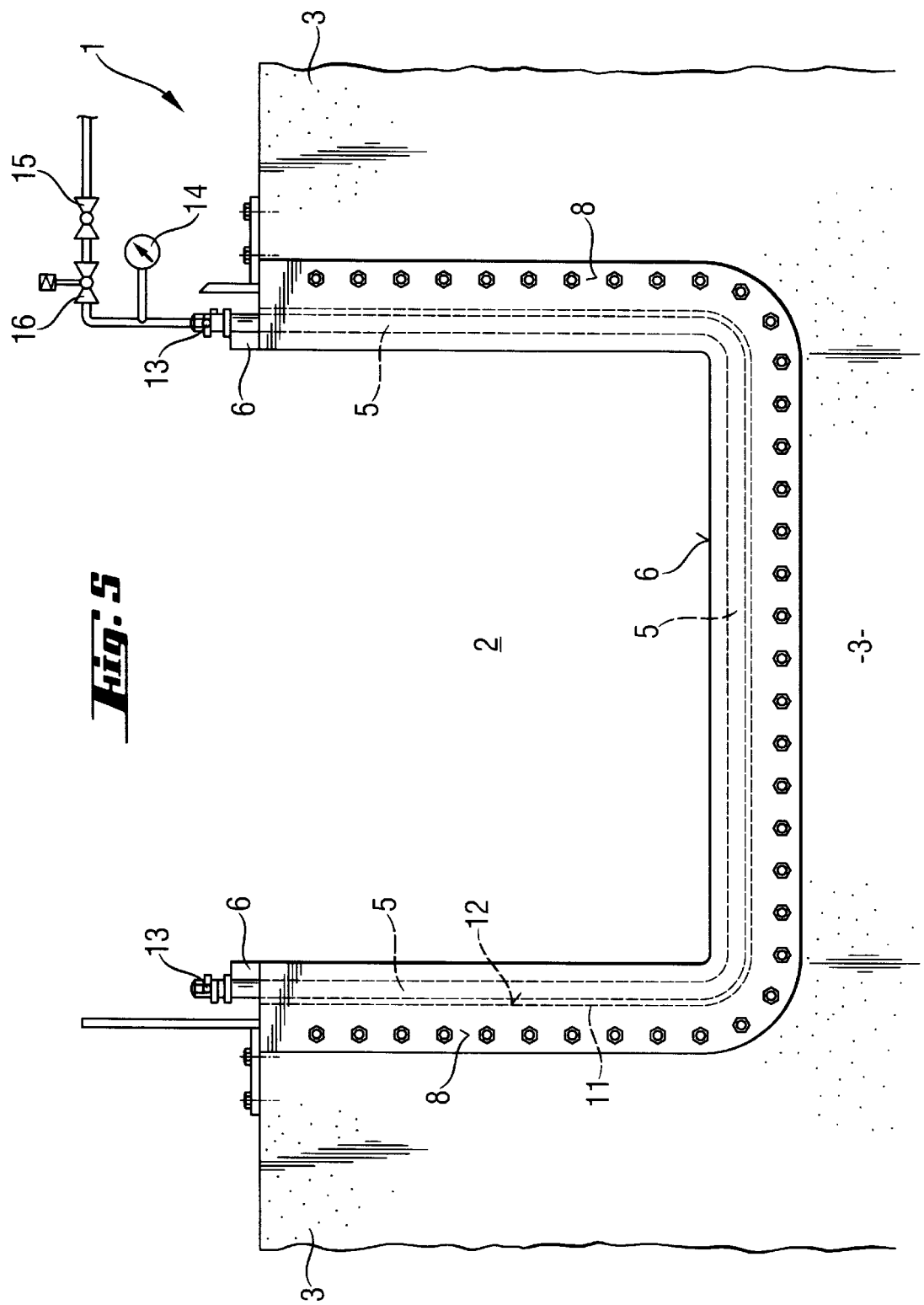

FIG. 1 presents a principle drawing of the settler and its overflow launder,

FIG. 2 shows one application of the invention viewed from above,

FIGS. 3a and 3b present the sealing element alternatives in more detail,

FIG. 4 presents another seal system according to the invention, viewed from above and FIG. 5 presents the solution shown in FIGS. 2 and 4 as seen from the side of the settler towards the launder.

As can be seen in FIG. 1, an overflow launder 2, which reaches across the far end and over the side walls of a settler 1 is embedded inside the settler and supported to sidewalls 3 and 4 and from elsewhere by relevant support structures (not shown in figure). For reasons of simplicity, only one overflow launder is depicted in the figure, even though the organic layer formed at the top of the settler and water layer at the bottom of the settler both discharge via separate overflow launders. In cross section, the overflow launder is essentially rectangular and open at the top.

FIG. 2 shows in detail a particular seal system for the overflow launder, where the launder junction 2 to the settler wall 3 is sealed by a primary sealing element 5, which comes between the launder and the wall. The primary seal is in this case a pneumatic, basically U-shaped seal. In addition to the pneumatic or pressurizable seal, a solid rubber profile can also be used as a seal, which is pressed between the settler wall and overflow launder, but however, a solid rubber profile does not offer all the advantages of a pneumatic seal. The overflow launder is preferably constructed from acid-resistant steel or fiber-glass-based material and the settler has an inside suitable coating, eg concrete with an HDPE protective layer. The pneumatic seal 5 is fitted tightly around the overflow launder at the points of the settler wall and is supported in place by a projection 7 on launder wall 6. As an extension of the overflow launder there is a flange 8 to support the structure. The launder wall 6 can also be constructed in a thicker than usual manner at the junction, as FIG. 2 shows.

FIG. 3a illustrates that the pneumatic seal 5 is preferably manufactured from several parts. The outermost seal profile 9 is made of material resistant to organic extraction solution and acidic aqueous solution such as e.g. nitrile-butadiene rubber (NBR). Inside it is a pressurizable hose 10, which is reinforced and further coated preferably with a PVC layer. The seal will have to withstand pressures of eg 1.0–6 bar. To produce the required pressure, the plant's compressed air network can be used, furnished with a decompression valves, or separately, a pump used for inflating car tires. It is evident that the construction needs its own pressure gauges, safety valves and other equipment. When the hose seal is put in place, a vacuum is induced, and after installation compressed air is routed to the hose. When choosing the pressure area, the durability of the overflow launder construction must be considered. FIG. 3b presents an alternative, where primary seal 5 is a solid rubber profile.

According to the seal solution presented in FIG. 4, the primary elastic seal is placed in the same as in FIG. 2, but outside the primary seal 5 there is an additional elastic seal, so-called collar seal 11, which provides a double-seal to the junction. The collar seal 11 can also be made from e.g. HDPE plate, and is vulcanized to the correct shape, i.e. nearly an U-shape according to the cross section of the launder. The plate seal 11 is attached to the settler facing wall e.g. by welding and connected via the flange joint to the support flange 8 of the overflow launder with the aid of a plate 12. The remaining gap between the primary seal 5 and collar seal 11 can be preferably filled with clean water, whereby leaks in both the organic and aqueous solution phases can be detected and the hydrostatic pressures are in equilibrium.

FIG. 5 presents the layout in FIG. 4 for the end of the overflow launder, seen endwise. It can be seen that the pneumatic seal 5 has been tightly placed around the launder wall 6, outside which is collar seal 11 attached via the plate 12. The top ends of the pneumatic seal are furnished 15 with feed and back pressure valves 13 as well as a pressure gauge 14, when a separate pump, such as a car pump, is used. If the plant compressed air network is used, check valve 15 and decompression valve 16 are used.

It is clear that within the framework of the above invention, the size and shape of the seals and flanges can vary as well as the support structures and reinforcements. The essential factor here is that this method allows the massive structures at the end of the extraction settler to be sealed from thermal expansion and leaks arising for other reasons.

Thanks to the double-seal construction, both the pneumatic and the other elastic seal (preferably HDPE or rubber) can be changed separately without stopping the process, since the tightness can be guaranteed temporarily by single seal.

What is claimed is:

1. A seal element in combination with the junction between a settler of an extraction apparatus and an overflow launder at the far end of the settler, the seal element seals the junction wherein at least one elastic seal element is placed at the junction of an open-topped overflow launder and settler walls, the seal being a primary seal, the primary elastic seal element being placed around the overflow launder between the settler walls and the overflow launder, the primary elastic seal element being a pneumatic hose-type element, formed from an outer seal profile and a pressurizable hose which is placed inside the profile.

2. A seal element according to claim 1, wherein the outer seal profile is manufactured from material resistant to organic extraction solution and acidic aqueous solution.

3. A seal element according to claim 1, wherein the primary seal is basically U-shaped when mounted in place, viewed in the direction of the overflow launder.

4. A seal element according to claim 1, wherein the pneumatic hose-type seal element is furnished with valves at its ends.

5. A seal element in combination with the junction between a settler of an extraction apparatus and an overflow launder at the far end of the settler, the seal element seals the junction wherein at least one elastic seal element is placed at the junction of an open-topped overflow launder and settler walls, the seal element being a primary seal, the primary elastic seal element being a pneumatic hose-type element that is placed around the overflow launder between the settler walls and the overflow launder, the pneumatic hose seal element being pressurized when in place.

6. A seal element in combination with the junction between a settler of an extraction apparatus and an overflow launder at the far end of the settler, the seal element seals the junction wherein at least one elastic seal element is placed at the junction of an open-topped overflow launder and settler walls, the seal element being a primary seal, and wherein in addition to the primary seal element which seals the junction between the overflow launder and the settler walls, an elastic collar seal is placed outside the junction, which collar seal is fitted tightly to the structures of the settler walls and the overflow launder.

7. A seal element according to claim 6, wherein the gap between the primary seal element and the collar seal is filled with water.

8. A seal element according to claim 6, wherein the collar seal is vulcanized basically to a U-shape and plate form.

9. A seal element according to claim 6 wherein the primary elastic seal element is a solid rubber profile.

* * * * *